United States Patent
Hamano et al.

(10) Patent No.: US 10,631,140 B2
(45) Date of Patent: Apr. 21, 2020

(54) SERVER, CLIENT, AND SYSTEM

(71) Applicant: HONDA MOTOR CO., LTD., Tokyo (JP)

(72) Inventors: Yusuke Hamano, Tokyo (JP); Masahiro Washizu, Tokyo (JP); Masaharu Senno, Saitama (JP); Takeshi Konno, Saitama (JP); Shuichi Kato, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 15/075,596

(22) Filed: Mar. 21, 2016

(65) Prior Publication Data
US 2016/0294984 A1 Oct. 6, 2016

(30) Foreign Application Priority Data

Mar. 31, 2015 (JP) .................................. 2015-073755

(51) Int. Cl.
*H04L 29/06* (2006.01)
*H04W 4/12* (2009.01)
(Continued)

(52) U.S. Cl.
CPC .............. *H04W 4/12* (2013.01); *B60L 53/30* (2019.02); *B60L 53/63* (2019.02); *B60L 53/64* (2019.02);
(Continued)

(58) Field of Classification Search
CPC ......... H04L 67/42; H04L 67/22; H04L 43/16; H04W 4/08; H04W 24/00; H04W 24/04;
(Continued)

(56) References Cited

U.S. PATENT DOCUMENTS 9,141,112 B1 * 9/2015 Loo ........................... G08G 1/22
2004/0148090 A1 * 7/2004 Melen ..................... G01C 21/26
701/482

(Continued)

FOREIGN PATENT DOCUMENTS

JP 2007-40711 A 2/2007
JP 2008-130008 A 6/2008

(Continued)

OTHER PUBLICATIONS

Japanese Office Action application No. 2015-073755 dated Sep. 6, 2016.

*Primary Examiner* — Vivek Srivastava
*Assistant Examiner* — Muhammad Raza
(74) *Attorney, Agent, or Firm* — Squire Patton Boggs (US) LLP

(57) ABSTRACT

To provide a server, a client, and a system capable of easily sharing conditions of members or mobile bodies which may affect a plan of the group. A server control device 31 communicates with a first client 10 via a server communication device 35 to recognize information concerning a first user or concerning a first mobile body 1. The server control device 31, in a case where the information is information indicating that a condition of the first user or first mobile body 1 is under a specific condition (FIG. 4/STEP 320— YES or FIG. 4/STEP 330—YES), transmits a notification that the condition of the first user or first mobile body 1 is under the specific condition to the second client 20 via the server communication device 35 (FIG. 4/STEP 324 or FIG. 3/STEP 332).

6 Claims, 8 Drawing Sheets

(51) Int. Cl.
*H04W 4/02* (2018.01)
*H04W 4/08* (2009.01)
*B60L 53/65* (2019.01)
*B60L 53/63* (2019.01)
*B60L 58/12* (2019.01)
*B60L 53/30* (2019.01)
*B60L 53/64* (2019.01)

(52) U.S. Cl.
CPC ............... *B60L 53/65* (2019.02); *B60L 58/12* (2019.02); *H04W 4/025* (2013.01); *H04W 4/08* (2013.01); *B60L 2240/622* (2013.01); *B60L 2240/662* (2013.01); *B60L 2240/72* (2013.01); *B60L 2250/12* (2013.01); *B60L 2250/16* (2013.01); *B60L 2260/52* (2013.01); *B60L 2260/54* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 30/14* (2013.01)

(58) Field of Classification Search
CPC ..... H04W 24/08; H04W 4/025; H04W 24/02; H04W 24/06; H04H 20/59; B60L 11/1861; B60L 2240/72; B60L 11/1862; G01C 21/3438; G08G 1/20; G08G 1/22; G08G 1/205; G08G 1/207; G05D 1/0295
See application file for complete search history.

(56) References Cited

U.S. PATENT DOCUMENTS

| | | | |
|---|---|---|---|
| 2006/0086406 A1* | 4/2006 | Sato | G06Q 30/08 141/94 |
| 2007/0027614 A1* | 2/2007 | Reeser | G01C 21/26 701/420 |
| 2009/0248665 A1* | 10/2009 | Garg | G06F 16/90324 |
| 2011/0082621 A1* | 4/2011 | Berkobin | B60L 58/10 701/31.4 |
| 2011/0224900 A1* | 9/2011 | Hiruta | G01C 21/3469 701/533 |
| 2012/0109409 A1* | 5/2012 | Hara | B60L 11/1818 701/1 |
| 2013/0060469 A1* | 3/2013 | Chen | G01C 21/3469 701/527 |
| 2013/0157609 A1* | 6/2013 | Vainik | G06F 11/0781 455/404.1 |
| 2014/0113674 A1* | 4/2014 | Joseph | H04W 4/021 455/519 |
| 2014/0188382 A1* | 7/2014 | Pan | G01C 21/3469 701/410 |
| 2014/0210616 A1* | 7/2014 | Ramachandran | G08B 21/0227 340/539.13 |
| 2014/0302774 A1* | 10/2014 | Burke | G07C 5/08 455/3.05 |
| 2014/0347973 A1* | 11/2014 | Yu | H04W 24/04 370/216 |
| 2015/0120181 A1* | 4/2015 | Puhler | G01C 21/3438 701/422 |
| 2016/0138925 A1* | 5/2016 | Takahashi | G01C 21/3697 701/533 |
| 2016/0252381 A1* | 9/2016 | Kwak | G01F 9/00 701/123 |
| 2016/0284138 A1* | 9/2016 | Adderly | G07C 5/006 |
| 2017/0030728 A1* | 2/2017 | Baglino | G01C 21/3469 |
| 2017/0074671 A1* | 3/2017 | Yoshimura | G08G 1/096716 |
| 2018/0025554 A1* | 1/2018 | Gibson | G07C 5/008 701/36 |

FOREIGN PATENT DOCUMENTS

| | | |
|---|---|---|
| JP | 2011-075382 A | 4/2011 |
| JP | 2013-210979 A | 10/2013 |
| JP | 2013210979 A * | 10/2013 |

* cited by examiner

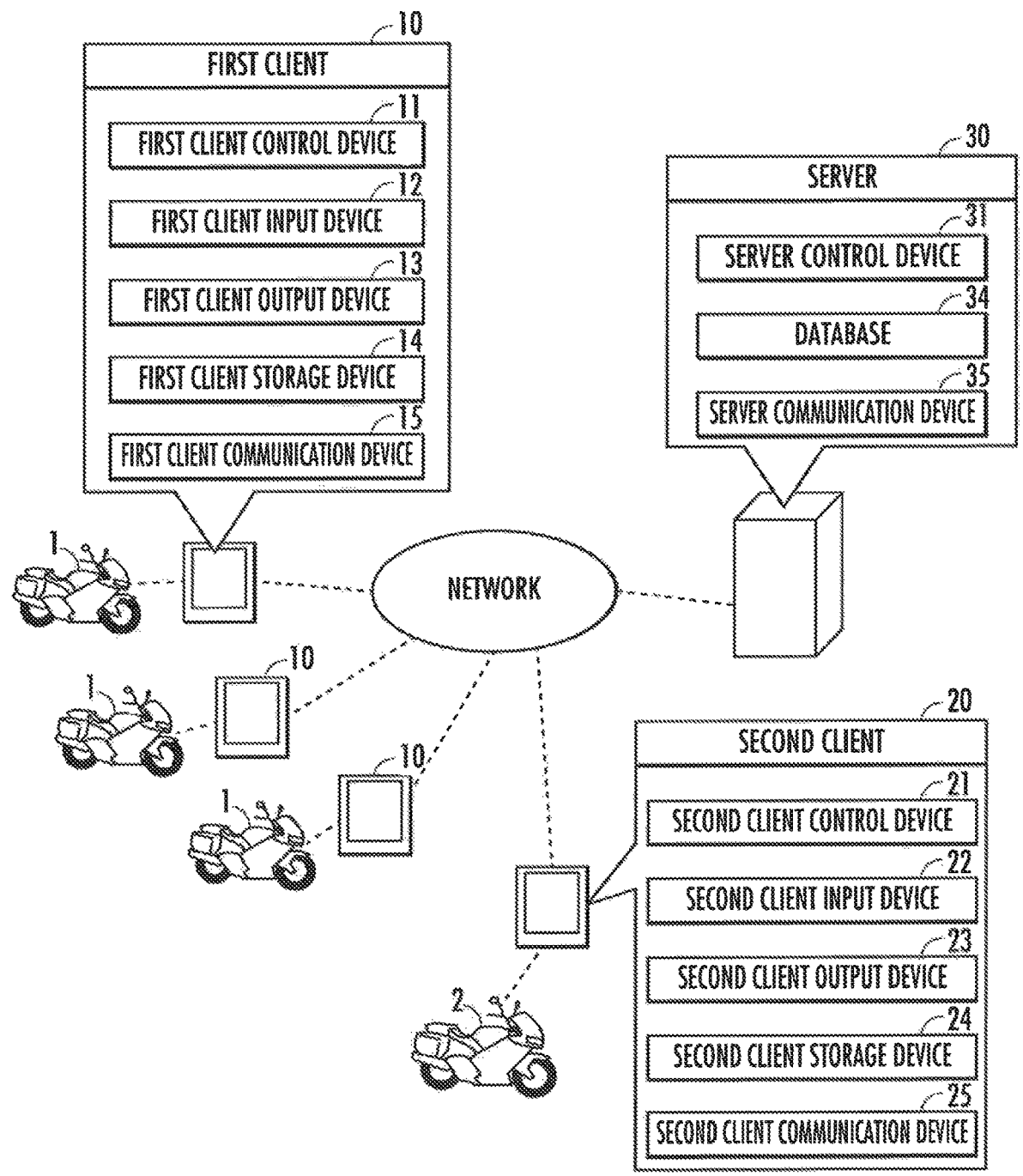

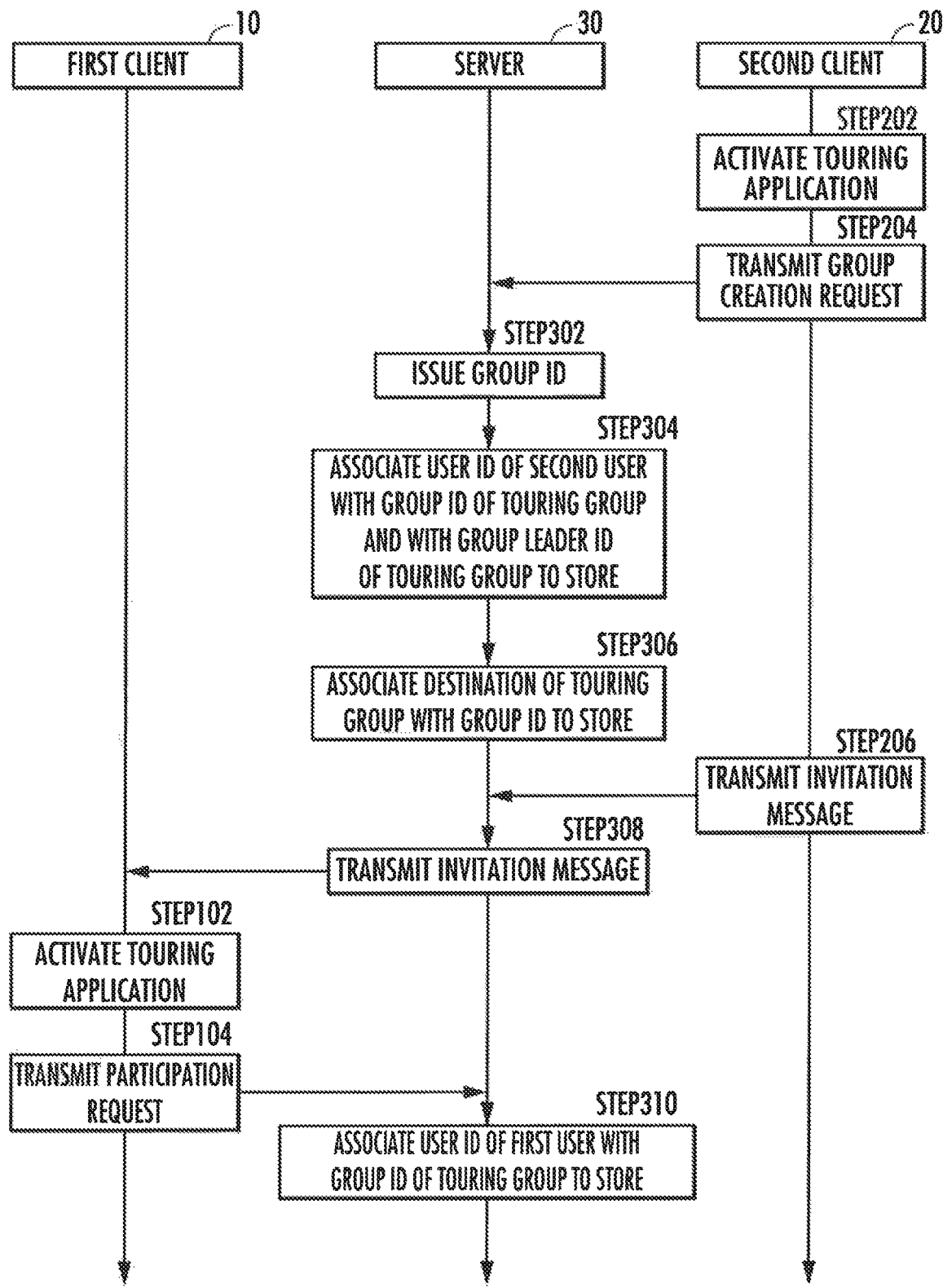

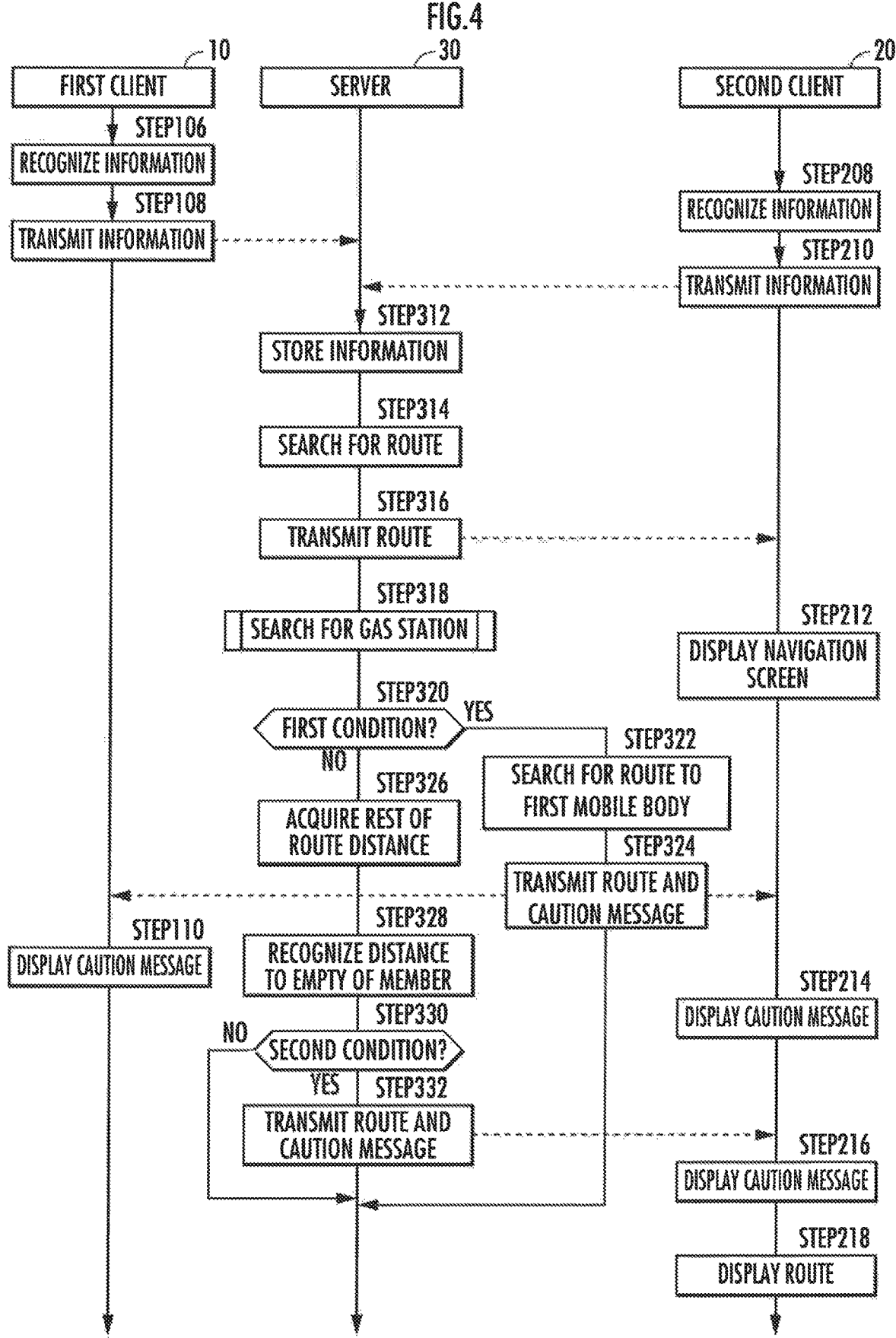

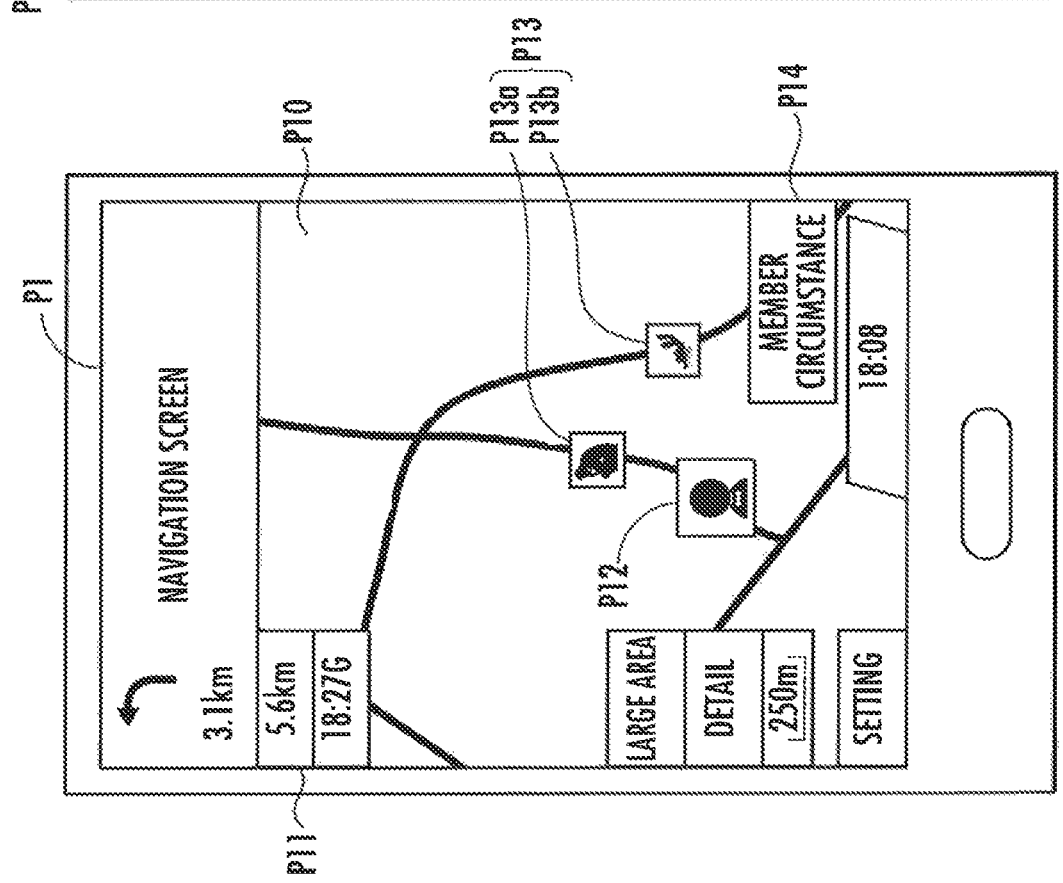

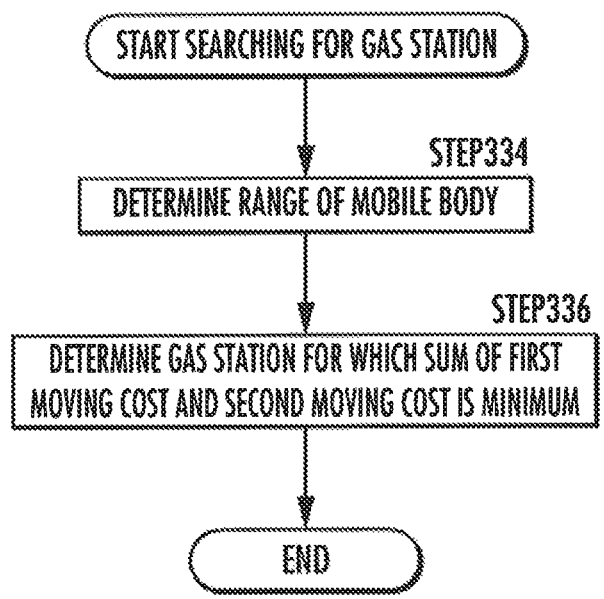

SERVER, CLIENT, AND SYSTEM

BACKGROUND OF THE INVENTION

Field of the Invention

The present invention relates to a server, a client, and a system.

Description of the Related Art

In the past, an information sharing system has been proposed which is used for grasping a circumstance of each member belonging to a group when the group runs toward the same destination point.

For example, Japanese Patent Laid-Open No. 2013-210979 has proposed an information sharing system including an information sharing server which transmits and receives shared information of a group, and a portable information terminal which includes a first reception unit which receives, from the information sharing server, shared information of a group to which an owner of the portable information terminal belongs, and a control unit which displays positional information and identification information of the portable information terminal included in the shared information as well as a captured image in a traveling direction of a vehicle on a display unit.

According to the information sharing system, on a captured image in a traveling direction of the own vehicle, information concerning other vehicles belonging to the same group present in the same direction is displayed depending on a position of the other vehicles. This allows a driver of the own vehicle to easily and intuitively grasp at what position other vehicles belonging to the same group exist with respect to the own vehicle on a real image.

When a group collectively acts, there may be a case where the group occasionally changes a plan depending on conditions of the vehicles used by members belonging to the group, the conditions including a remaining gasoline level or a remaining charge level, or a health condition of a member such as a physical condition of the member.

Therefore, the present invention has an object to provide a server, a client, and a system capable of easily sharing conditions of members or mobile bodies which may affect a plan of the group.

SUMMARY OF THE INVENTION

A server according to the present invention is a server which communicates with a first client via a server communication device to recognize information concerning a first user that is a user of the first client or concerning a first mobile body on which the first user rides, the server including, a server control device configured to, in a case where the information is information indicating that a condition of the first user or the first mobile body is under a specific condition, transmit a notification that the condition of the first user or the first mobile body is under the specific condition to a second client of a second user that is a user belonging to a same group as the first user via the server communication device.

According to the server of the above configuration, in the case where the condition of the first user or first mobile body indicated, via the communication with the first client, in the information of the first user or the first mobile body which is connected with the first client, is under the specific condition, the notification that the condition of the first mobile body or first user is under the specific condition is transmitted to the second client. This allows the second user to easily recognize the condition of the first user or first mobile body which is likely to affect the action of the group.

In the server of the above configuration, it is preferable that the server control device is configured to determine that the condition of the first mobile body is under the specific condition when a parameter falls below a threshold, the parameter representing a remaining level of a first energy that is energy consumed in running of the first mobile body or a remaining level of a second energy that is energy consumed in other than the running of the first mobile body.

According to the server of the above configuration, the second user is caused to easily recognize that the energy remaining level of the first mobile body which is likely to affect the action of the group becomes a predetermined threshold or less.

As a result, the second user can be given an opportunity for being caused to take an action in consideration of the condition of the first mobile body, for example, the second user instructs the member of the group to stop by an energy supply facility supplying the first energy and the second energy, or the second user stops by the nearest energy supply facility to the first user in order to join the first user.

In the server of the above configuration, it is preferable that the server control device is configured to recognize a current position of the first mobile body via the communication with the first client, search for a first route that is a route connecting a current position of the first mobile body with a destination, and define the threshold on a basis of the remaining level of the first energy which is required to travel all the first route.

According to the server of the above configuration, in the case where a probability of shortage of a remaining level of the first energy required for any mobile body is high in consideration of the remaining level of the first energy which is required to travel all the first route, the second user is notified of that effect.

As a result, the second user can be appropriately given an opportunity for being caused to take an action in consideration of the condition of the first mobile body.

In the server of the above configurations, it is preferable that the server control device is configured to recognize a current position of the first mobile body via the communication with the first client, and transmit a position of an energy supply facility, the position of which a first moving cost that is a moving cost for the first mobile body is minimum, to the second client when the parameter falls below the threshold.

According to the server of the above configuration, the position of the energy supply facility in which the moving cost for the first mobile body is minimum, is transmitted to the second client. This can appropriately give the second user an opportunity for being caused to take an action in consideration of the condition of the first mobile body, for example, the second user may join the first user at the energy supply facility.

In the server of the above configuration, it is preferable that the server control device is configured to recognize a current position of the first mobile body via the communication with the first client, recognize a current position of a second mobile body that is a mobile body of the second user via communication with the second client, and search for an energy supply facility that allows a sum of a first moving cost that is a moving cost for the first mobile body and a second moving cost that is a moving cost for the second mobile body to be minimum and transmit a position of the energy supply facility via the server communication device to the second client.

According to the server of the above configuration, the position of the energy supply facility is transmitted to the second client for which position the sum of the first moving cost and the second moving cost is minimum. This can give the second user an opportunity for taking an appropriate action in consideration of the condition of the first mobile body while reducing a burden on both of the first user and the second user.

In the server of the above configuration, it is preferable that the server control device is configured to recognize the current positions of a part or all of the mobile bodies belonging to the group via communication with the first client and the second client, search for a first route that is a route connecting a current position of each of the part or all of the mobile bodies with a destination of the mobile body, and in searching for a second route that is a route connecting the current position of the mobile body with the energy supply facility, evaluate the moving cost of the mobile body such that the moving cost for the mobile body to the energy supply facility is higher as a deviation degree that is a degree of deviation from the first route is greater.

According to the server of the above configuration, the energy supply facility present at a position which has smaller deviation from the route of each mobile body belonging to the group is evaluated as the energy supply facility having a low moving cost from the mobile body belonging to the group. As a result, the energy supply facility is appropriately searched out which is at the position not involving the mobile body belonging to the group in a big change of the route, and thus, the second user is notified of the position of the energy supply facility where each member can gather without getting a feeling of strangeness.

In the server according to the present invention, it is preferable that the server control device is configured such that if determining that the condition of the first user or first mobile body is under a first condition that is the specific condition in which it is difficult to continue to travel, notifies a client of a user belonging to a first user group including the second user that the condition of the first user or first mobile body is under the first condition, and if determining that the condition of the first user or first mobile body is under a second condition that is the specific condition in which it is possible to continue to travel, notifies a client of a user belonging to a second user group that is different from the first user group and includes the second user that the condition of the first user or first mobile body is under the second condition.

In the present invention, the "first user group" and the "second user group" may be a user group including a plurality of users as well as a user group including one user.

According to the server of the above configuration, a destination to be notified of the condition of the first mobile body can be changed depending on a type of the condition of the first mobile body, and thus, the condition of the first mobile body which is likely to affect the action of the group is appropriately shared.

In the server of the above configuration, it is preferable that the first user group includes all users belonging to the group, and the second user group includes a user having a particular social relationship with the first user.

According to the server of the above configuration, a notification is made to the user having a particular social relationship with the first user, which may give the user an opportunity for taking a flexible measure, for example, the users of the group who have a particular social relationship with each other may determine a meeting place.

In the server described above, it is preferable that the first user group includes all users belonging to the group, and the second user group includes a user of a mobile body having a particular regional relationship with the first mobile body.

According to the server of the above configuration, a notification is made to the user of the mobile body having the particular regional relationship with the first mobile body, which may give the user an opportunity for taking a flexible measure, for example, the users of the mobile bodies having a particular regional relationship with each other may determine a meeting place.

In the server described above, it is preferable that the first user group includes all users belonging to the group, and the second user group includes another user or a user of another mobile body that is under the specific condition.

According to the server of the above configuration, a notification is commonly made to a user or a user of another mobile body that is under the specific condition, which may give the user an opportunity for taking a flexible measure, for example, the users or users of other mobile bodies under the specific condition may determine a meeting place.

A system according to the present invention is a system including a first client used by a first user, a second client used by a second user belonging to a same group as the first user, and a server which communicates with the first client via a server communication device to recognize information concerning the first user or concerning a first mobile body on which the first user rides, in which the server includes a server control device configured to, in a case where the information is information indicating that a condition of the first user or the first mobile body is under a specific condition, transmit a notification that the condition of the first user or the first mobile body is under the specific condition to the second client via the server communication device.

According to the system of the present invention, an action and effect similar to the server of the present invention can be exerted.

A client according to the present invention is a client which recognizes information concerning a first user who is a user of the client or concerning a first mobile body on which the first user rides, and communicates with an external via a client communication device, the client including, a client control device configured to, in a case where the information is information indicating that a condition of the first user or the first mobile body is under a specific condition, transmit a notification that the condition of the first user or the first mobile body is under the specific condition to the external via the client communication device.

According to the client of the present invention, an effect similar to the server of the present invention can be exerted.

BRIEF DESCRIPTION OF THE DRAWINGS

FIG. 1 is a diagram showing a general configuration of an information providing system according to the present invention;

FIG. 3 is a flowchart illustrating a group forming and participation register process;

FIG. 4 is a flowchart illustrating an information sharing process in an event;

FIG. 5A is a diagram illustrating a configuration of a navigation screen and member circumstance screen, that is illustrating the configuration of a normal navigation screen; FIG. 5B is a diagram illustrating a configuration of a navigation screen and member circumstance screen, that is, illustrating the configuration of the member circumstance screen;

FIG. 8 is a flowchart illustrating a gas station search process.

Figure 2A:
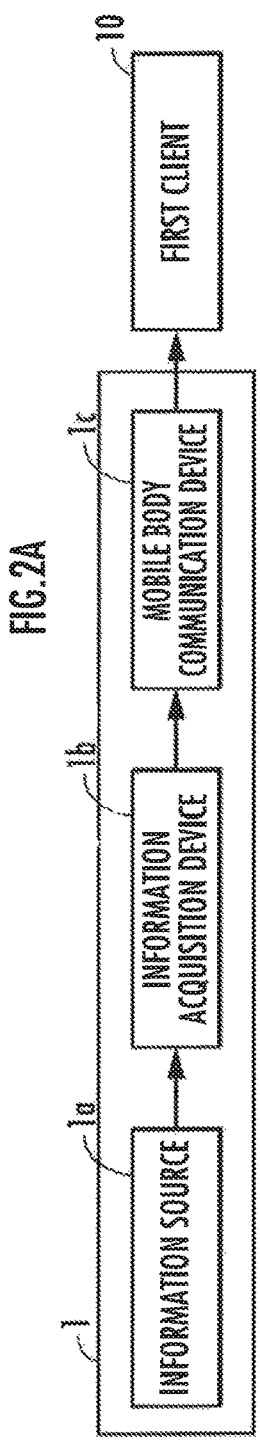
FIG. 2A is a diagram showing an information acquisition route from an information source for a first client and illustrating a configuration in which information is acquired from the information source via an information acquisition device and a mobile body communication device.

DETAILED DESCRIPTION OF THE PREFERRED EMBODIMENTS (Configuration)

An information sharing system shown in FIG. 1 includes a first client 10, a second client 20, and a server 30 which can communicate with each other via a network.

The information sharing system is a system which supports information sharing between a first user as a user of the first client 10 and a second user as a user of the second client 20.

A first embodiment describes an example in which the first user and the second user ride on a first mobile body 1 and a second mobile body 2, respectively, and the information sharing system supports the information sharing between the first user and the second user while their touring (going for ride) to the same destination.

The first mobile body 1 and the second mobile body 2 each are a mobile body that generates a driving force by supplying to a driving machine at least one of a fuel such as gasoline, light gas oil, alcohol, and hydrogen, and electric power (first energy). In the embodiment, a description is given of a motorcycle as an example in which the gasoline as the fuel is supplied to an engine to generate the driving force.

The first mobile body 1 and the second mobile body 2 each include a second energy storage (e.g., battery) for storing a second energy (e.g., electric power) consumed in other than running of the mobile body, for example, in operation of devices other than the driving machine which is mounted on the mobile body (devices such as for air conditioning).

In a case where the mobile body is a mobile body generating a driving force by supplying the electric power stored in a first battery to the driving machine, if the mobile body includes a second battery which is provided separately from the first battery and stores the electric power consumed in operation of the devices other than the driving machine which are mounted on the mobile body, the electric power supplied from the first battery corresponds to the first energy and the electric power supplied from the second battery corresponds to the second energy.

If the mobile body is configured such that the electric power stored in one battery is supplied to the driving machine and the devices other than the driving machine which are mounted on the mobile body, the relevant electric power corresponds to the first energy as well as to the second energy.

The first client 10 includes an information terminal such as a tablet terminal or smartphone whose size, shape and weight are designed so as to be portable by a user. The first client 10 may be an information terminal whose size and the like are designed so as to be mountable on the first mobile body 1 (e.g., motorcycle) on which the first user as a user of the first client 10 rides. The first client 10 includes a first client control device 11, a first client input device 12, a first client output device 13, and a first client storage device 14. The first client 10 further includes a first client communication device 15 for mutually communicating with an external terminal including the server 30 and the like in compliance with a communication standard suitable for long distance wireless communication such as WiFi®.

The first client control device 11 is configured to include a computer. The first client control device 11 has touring application software (hereinafter, referred to as "touring application") installed therein. The first client control device 11 is configured to perform an arithmetic process described later when the touring application is activated. The first client 10 has a self-position measurement function by use of a GPS or the like.

The first client control device 11 serves as a user interface manager (UIM) to adjust content displayed on a touch panel and the like depending on an aspect of a touch gesture on the touch panel by the user. The touch gesture includes a tap (single tap, double tap, and long tap), a flick (up flick, down flick, left flick, and right flick), a swipe, a pinch (pinch in and pinch out), a multi-touch or the like.

A phrase that one device "recognizes" information on the basis of communication with another device means that any arithmetic process is performed for acquiring the information by means of the communication, including cases where one device receives the information from another device, one device derives the information by performing a predetermined arithmetic process (such as a calculation process, or a search process) on signals received from another device, one device receives, from another device, the information as a result from an arithmetic process by the relevant another device, and one device reads out the information from an internal storage device or an external storage device in accordance with the received signal.

The first client input device 12 includes a position input device like a touch pad and the first client output device 13 includes a display device like a liquid crystal panel, and both devices are combined to configure the touch panel. In other words, the touch panel may serve as both of an input interface and an output interface. On the touch panel, a functional image is displayed depending on a function of an application (application software) installed in the first client 10.

The first client input device 12 may alternatively or additionally include a detection device for detecting an aspect of a non-contact user input operation (speech content or gesture) such as a voice input device (microphone) or an image capturing device. The first client output device 13 may additionally include a voice output device (speaker). In a case where the first client input device 12 may identify a non-contact user gesture (motion of facial expression, motion of a part of a body such as a fingertip or arm) by means of the image capturing device and the like, an aspect of the gesture may be detected as an aspect of an input operation by the first client control device 11.

Moreover, the first client 10 is configured to connect with the first mobile body 1 to be able to receive various pieces of information from the first mobile body 1.

More specifically, as shown in FIG. 2A, an information source 1a mounted on the first mobile body 1 (first mobile body 1 itself, gasoline tank, battery, engine oil tank, air accumulator tank, engine inlet, exhaust outlet, engine cooling water, fuel injector (FI), antilock brake system (ABS), air-bag, tire, dual clutch transmission (DCT), and the like) is connected with an information acquisition device 1b, for example.

The information acquisition device 1b includes an information acquisition device, for example, a positioning device such as the GPS, a gasoline level meter, a battery charge level meter, an oil level meter, a temperature sensor, a pressure sensor, various motion monitoring devices, and tire pressure monitoring system (TPMS). The information acquisition device 1b acquires from the information source 1a various pieces of information (e.g., positional information of the first mobile body 1, consumable supply information of gasoline level, battery charge level, engine oil level stored in the engine oil tank, oil pressure of the engine oil, and amount and pressure of the compressed air stored in the air accumulator tank, and information concerning an operation condition of the first mobile body 1 including temperature of the engine inlet (inlet air temperature), temperature of the engine exhaust outlet (exhaust temperature), temperature of the engine cooling water, operation condition of the fuel injector, operation condition of the anti-blocking system, operation condition of the air-bag, air pressure of the tire, and operation condition of the dual clutch transmission).

The information source 1a is not necessarily limited to the devices mounted on the first mobile body 1, and the information acquisition device 1b may uses a member riding on the first mobile body 1 (including the first user) as the information source 1a to acquire a condition of the member, for example. In this case, for example, a measurement device of heart rate and the like provided to a steering wheel, seat or the like may serve as the information acquisition device 1b to measure a heart rate of the riding member. Further, a camera mounted on the first mobile body 1 or first client may serve as the information acquisition device 1b to capture a state inside the mobile body and a state of the riding member.

The information acquisition device 1b is connected with a mobile body communication device 1c mounted on the first mobile body 1. The information acquired by the information acquisition device 1b is transmitted to the first client 10 by way of a Wifi® function, BlueTooth® function, wire communication function or the like of the mobile body communication device 1c.

Figure 2B:
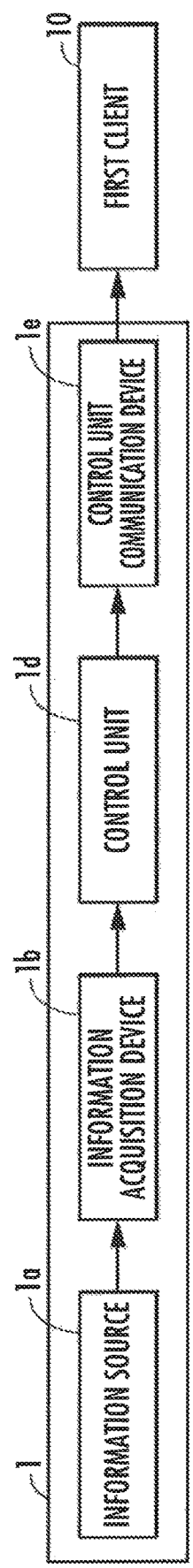
FIG. 2B is a diagram showing an information acquisition route from the information source for the first client and illustrating a configuration in which information is acquired from the information source via the information acquisition device, a control unit, and a control unit communication device.

In place of this configuration, for example, as shown in FIG. 2B, the information acquired by the information acquisition device 1b may be recognized by a control unit 1d such as a navigation device and transmitted to the first client 10 via a control unit communication device 1e that is a communication device of the control unit 1d.

Figure 2C:
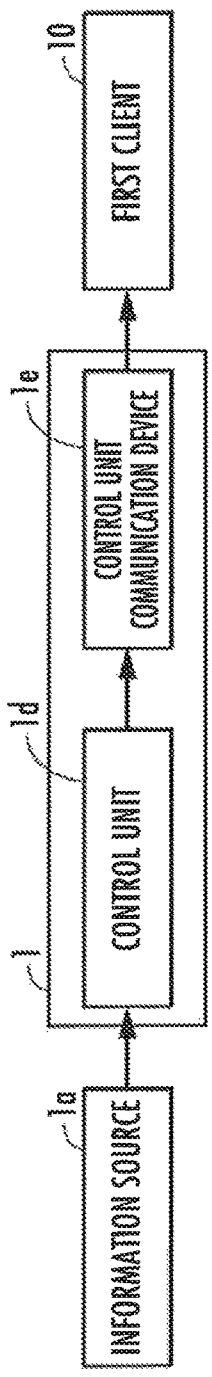
FIG. 2C is a diagram showing an information acquisition route from the information source for the first client and illustrating a configuration in which information is acquired from the information source via the control unit, and the control unit communication device.

In addition, in place of these configurations, for example, as shown in FIG. 2C, the control unit 1d may recognize information directly from the information source 1a such that the information may be transmitted to the first client 10 via the control unit communication device 1e that is a communication device of the control unit 1d. In this case, the control unit 1d may recognize information, as the information from the information source 1a, from an information source external to the first mobile body 1 such as a traffic information server or the like in addition to the information source described above.

The second client 20, similar to the first client 10, includes an information terminal such as a tablet terminal or smartphone whose size, shape and weight are designed so as to be portable by a user. The second client 20 may be an information terminal whose size and the like are designed so as to be mountable on the second mobile body 2. The second client 20 includes a second client control device 21, a second client input device 22, a second client output device 23, and a second client storage device 24. The second client 20 further includes a second client communication device 25 for mutually communicating with an external terminal including the server 30 and the like in compliance with a communication standard suitable for long distance wireless communication such as WiFi®.

The second client control device 21 is configured to include a computer. The second client control device 21 has touring application installed therein. The second client control device 21 is configured to perform an arithmetic process described later when the touring application is activated. The second client 20 has a self-position measurement function by use of a GPS or the like.

Detailed configurations of the second client control device 21, second client input device 22, second client output device 23, second client storage device 24, and second client communication device 25 are the same as those of the first client control device 11, first client input device 12, first client output device 13, first client storage device 14, and first client communication device 15, respectively, and thus, a description thereof is omitted.

Moreover, the second client 20 also is connected with the second mobile body 2 to acquire various pieces of information from various information sources, similarly to the first client 10.

The server 30 includes a server control device 31, a database 34 (server storage device) and a server communication device 35. The server control device 31 includes a memory such as a ROM and a RAM (storage device), and an I/O circuit or the like. The server control device 31 is configured to perform the arithmetic process described later.

A phrase that a component of the present invention is "configured to" perform the arithmetic process means that an arithmetic processing device such as an CPU constituting the component is "programmed" or "designed" to read out necessary information and software from the memory such as a ROM and a RAM or a storage medium and perform the arithmetic process on the information in accordance with the software. The respective components may be constituted by a common processor (arithmetic process device) or the respective components may be constituted by a plurality of processors communicable with each other.

All or a part of a computer constituting the server control device 31 may be constituted by a computer constituting the first client control device 11 or the second client control device 21. For example, one or more first clients 10 as mobile stations may constitute all or a part of the server 30.

(Registration of Group and Participation Register Process)

Hereinafter, with reference to FIG. 3, a description is given of a series of processes in a case where a group for information sharing is created and the first user participates in the group in an event planed by the second user (touring or the like).

The second client control device 21 activates a touring application in response to an operation by the second user which is detected by the second client input device 22 (FIG. 3/STEP 202). In response to the operation by the second user detected by the second client input device 22, a user ID of the second user which is input by the second user or stored in the second client storage device in advance, and a creation request (including information on a touring destination) to create a group (hereinafter, referred to as "touring group") are transmitted via the second client communication device 25 to the server 30 (FIG. 3/STEP 204).

The server control device 31, when receiving the user ID of the second user and the creation request for the touring group via the server communication device 35, issues a group ID of the touring group (FIG. 3/STEP 302).

The server control device 31 associates the user ID of the second user and the group ID of the touring group received from the second client with each other and stores in the database 34, and also associates the user ID of the second user with a group leader ID of the touring group to store in the database 34 (FIG. 3/STEP 304).

The server control device 31 associates the touring destination included in the creation request for the touring group with the group ID and stores in the database 34 (FIG. 3/STEP 306).

The second client control device 21 transmits to the server 30, in response to the operation by the second user detected by the second client input device 22, an invitation message for inviting the first user to the touring group (e.g., message such as "would you care to participating in a touring group?"), the group ID of the touring group, and a user ID of the first user (FIG. 3/STEP 206).

When receiving the invitation message for inviting the first user to the touring group, the group ID of the touring group, and the first user ID, the server control device 31 adds information for instructing to activate the touring application to the received invitation message for inviting the first user to the touring group to transmit to a destination included in contact information associated with the user ID of the first user (FIG. 3/STEP 308).

In response to an operation by the first user, the first client control device 11 activates the touring application on the basis of the information for instructing to activate the touring application included in the received message (FIG. 3/STEP 102). The first client control device 11, in response to the operation by the first user, transmits to the server 30 the user ID of the first user and a participation request to participate in the touring group on the basis of the group ID of the touring group (FIG. 3/STEP 104).

Supplementally, the first user does not necessarily receive the invitation message from the second user, and, for example, the first client control device 11 may, in response to the operation by the first user, search for the touring group, and transmit the user ID of the first user and the participation request to participate in the touring group to the server 30.

When receiving the user ID of the first user and the participation request to participate in the touring group, the server control device 31 associates the user ID of the first user with the group ID of the touring group, and stores in the database 34 (FIG. 3/STEP 310).

As described above, the participation registration of the first user in the touring group is made.

(Information Sharing Process in Event)

Next, with reference to FIG. 4 to FIG. 7, a description is given of a supporting process for information sharing between the first user and the second user at a time of an event (touring) by the first client 10, the second client 20 and the server 30.

This process is performed respectively in the first client 10, the second client 20 and the server 30 at any timing. For example, the process may be performed every five minutes in the first client 10, every ten minutes in the second client 20, and every two minutes in the server 30.

The first client control device 11 recognizes from the information source 1a various pieces of information including the positional information of the first mobile body 1, consumable supply information, and information concerning the operation condition of the first mobile body 1 (FIG. 4/STEP 106), and transmits the recognized information together with the group ID of the touring group and the user ID of the first user to the server 30 (FIG. 4/STEP 108).

Here, the reason for transmitting the group ID of the touring group is in order to identify which group the information concerns in a case where one user participates in a plurality of groups at the same time. If one user cannot participate in a plurality of groups at the same time, it is not necessary to transmit the group ID. Moreover, if the server 30 can identify which group the user takes a group action of, for example, by referring to an implementation time zone of the group action of the group, it is not necessary to transmit the group ID.

In parallel with the above step, the second client control device 21 also recognizes from the information source 1a various pieces of information including the positional information of the second mobile body 2, consumable supply information, and information concerning the operation condition of the second mobile body 2 (FIG. 4/STEP 208), and transmits the recognized information together with the group ID of the touring group and the user ID of the second user to the server 30 (FIG. 4/STEP 210).

The server 30 associates the information received from the first client 10 and the second client 20 with the group ID of the touring group and the user ID, and stores in the database 34 (FIG. 4/STEP 312).

The server control device 31 uses the positional information of the first mobile body 1 and the positional information of the second mobile body 2 in the received information to search for a first route that is a route from a current position of each of the first mobile body 1 and the second mobile body 2 to the destination of the event registered in advance at FIG. 3/STEP 306 on the basis of map information stored in advance in the database 34 (FIG. 4/STEP 314).

The server control device 31 refers to the group leader ID associated with the group ID of the touring group to identify the second client 20 of the second user that is the group leader and transmit route information of the searched first route to the second client 20 (FIG. 4/STEP 316). The server control device 31 may transmit the route information of the first route also to the first client 10.

In place of transmitting the route information of the first route by the server control device 31, the second client control device 21 may search for the first route.

The second client control device 21 having received the route information of the first route via the second client communication device 25 causes the second client output device 23 to display a first navigation screen P1 shown in FIG. 5A (FIG. 4/STEP 212). The first client control device 11 having received the route information of the first route may also cause the first client output device 13 to display a screen similar to FIG. 5A.

The first navigation screen P1 includes a route guiding image P10 created on the basis of the route information of the first route and the map information stored in the second client storage device 24, running support detail information P11 including an instruction for a running direction in terms of an intersection or the like, and a distance and expected arrival time to the destination, a self-position icon P12 indicating a current position of the user himself or herself (second user) which is displayed to be superimposed on the route guiding image P10, a member position icon P13 indicating a position of another member (first user) participating in the touring, and a member circumstance detail button P14 for change to a detail screen of a circumstance of another member.

Supplementally, the second client control device 21, when detecting pressing-down of the member circumstance detail button P14 (touch operation) via the second client input device 22, causes the second client output device 23 to display a member circumstance screen P2 for displaying the circumstance of each member shown FIG. 5B.

The member circumstance screen P2 includes a back button P21 for redisplaying the first navigation screen P1, a member information display P22 for displaying the circumstances of the respective members including the user himself or herself (second user), and a message button P23 for transmitting a fixed message to the member.

The member information display P22 includes an icon P22a indicating each member, a member name display P22b indicating a member name, a distance-to-empty display P22c indicating a distance to empty, an alarm icon P22d indicating that the remaining battery charge level or the oil displayed in the information acquired from each client is equal to or below a predetermined threshold value, and a fuel level display P22e indicating a fuel level.

A method of determining the distance to empty is described later.

The server control device 31 performs a gas station search process described later to search for a second route that is a route from each mobile body to a position of a gas station (energy supply facility), the route having a minimum sum of the moving costs for both of the first mobile body 1 and the second mobile body 2 (FIG. 4/STEP 318). A description is given of the detail search process for the second route later.

The server control device 31 determines, on the basis of the information concerning the operation condition of the first mobile body 1, whether or not a condition of the first mobile body 1 is in a first condition in which it is difficult to continue to travel (FIG. 4/STEP 320). For example, if the tire pressure included in the information concerning the operation condition of the first mobile body 1 is equal to or less than a predetermined air pressure, the condition of the first mobile body 1 is determined to be under the first condition.

If the above determination result is positive (FIG. 4/STEP 320—YES), the server control device 31 searches for a third route that is from the current position of the second mobile body 2 to a place near the current position of the first mobile body 1 or to a place where a rest can be taken near the former place (FIG. 4/STEP 322), and transmits to the clients of all users belonging to the group (first user group) including the first client 10 and the second client 20 together with a caution message notifying that the first mobile body 1 is under the first condition in which it is difficult to continue to travel (FIG. 4/STEP 324).

The server 30 may transmit the above caution message also to a user who does not belong to the group (e.g., user registered as emergency contact information).

In place of transmitting the route information of the third route by the server control device 31, the first client control device 11 and the second client control device 21 which receive the caution message may search for the third route.

Figure 6A:
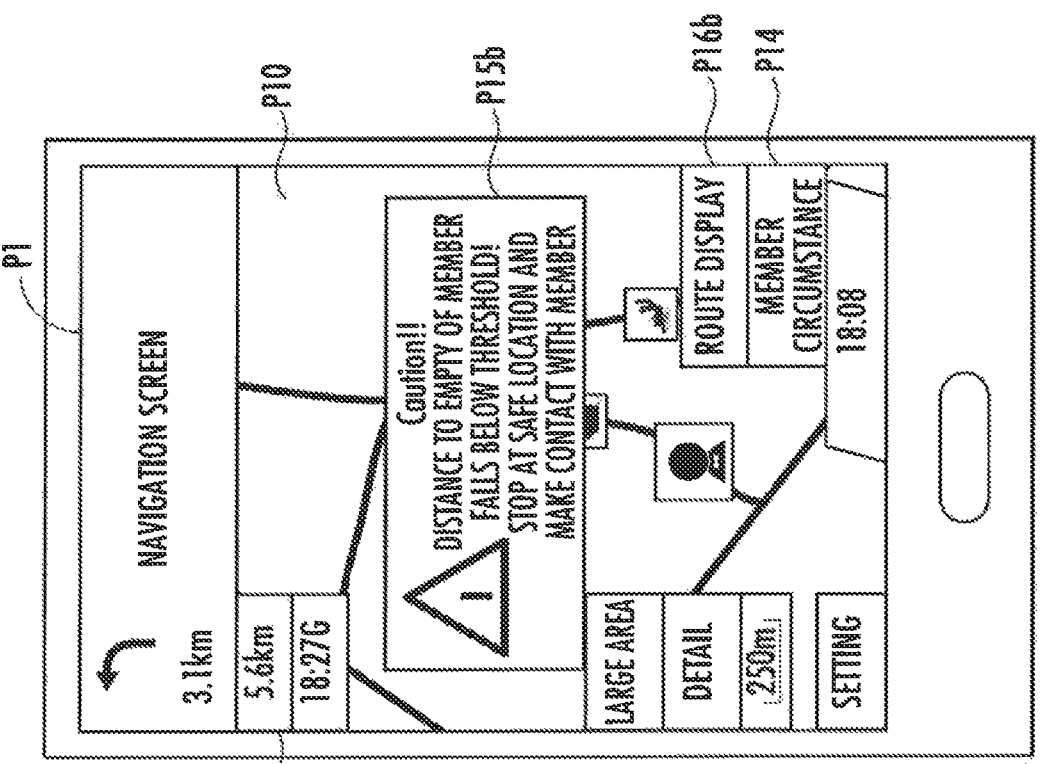
FIG. 6A is a diagram illustrating a configuration of a navigation screen which displays a caution that a user has fallen into a specific condition, that is, illustrating the configuration of the navigation screen which displays the caution that the user has fallen into a first condition.

The second client control device 21 having received the route information and caution message of the third route causes the second client output device 23 to display a caution message display P15a indicating that the first mobile body 1 is under the first condition in which it is difficult to continue to travel together with a route display button P16a for indicating the third route to be superimposed on the route guiding image P10, as shown on FIG. 6A (FIG. 4/STEP 214). The second client control device 21 may display an icon P13a of the first user under the first condition at a larger size than normal in a second navigation screen P3.

If the first client control device 11 different from the client of the first mobile body 1 under the first condition receives the route information of the third route and caution message, the first client control device 11 performs the process similar to FIG. 4/STEP 214 (FIG. 4/STEP 110).

The process in the case where pressing-down of the route display button P16a is detected in the first client input device 12 or the second client input device 22 is similar to a process in FIG. 4/STEP 218 described later.

If the determination result in FIG. 4/STEP 316 is negative (FIG. 4/STEP 320—NO), the server control device 31 recognizes a distance from the current position of each of the respective mobile bodies to the destination (FIG. 4/STEP 326). Along with this, the server control device 31 recognizes a distance from the current position of each of the mobile bodies to each of gas stations.

The server control device 31 recognizes the distance to empty that is a distance possible to continuously travel without fuel resupply for each of the mobile bodies (FIG. 4/STEP 328).

For example, the server control device 31 may recognize a value calculated by multiplying a predefined coefficient (e.g., a distance possible to be traveled by the mobile body per unit of fuel) by the remaining fuel level of the mobile body as the distance to empty of the mobile body, for example. The server control device 31 may refer to a table in which a relationship between the remaining fuel level and the distance to empty is predefined to recognize the distance to empty of the mobile body.

The server control device 31 determines for each first mobile body 1 whether or not the condition of the first mobile body 1 is in a second condition in which it is difficult to continue to travel to the destination without fuel resupply (FIG. 4/STEP 330).

For example, the server control device 31 may determine that the condition of the first mobile body 1 is under the second condition in which it is difficult to continue to travel to the destination without fuel resupply, if the distance to empty of the first mobile body 1 recognized in FIG. 4/STEP 328 is smaller than a sum of the distance from the current position of the first mobile body 1 to the destination recognized in FIG. 4/STEP 326 and the distance from the current position of the first mobile body 1 to the gas station.

Supplementally, it is preferable that each member goes to the destination with the number of times to stop by at the gas station being reduced as much as possible while the touring. On the other hand, if any member falls into a condition in which a probability of being unable to arrive at the destination is high in consideration of remaining the fuel level and the like or a condition (second condition) in which a probability of out-of-fuel before arriving at the gas station is high even if the member arrives at the destination, it is preferable to notify other members of that effect to induce them to stop by the gas station. Moreover, it is preferable that the fuel and the like for travelling to the nearest gas station remains at the time of that notification. In a view like this, the above description is given of comparison between the "sum of the distance from the current position of the first mobile body 1 to the destination and the distance from the current position of the first mobile body 1 to the gas station" and the distance to empty of the first mobile body.

In place of the above, a "distance from the current position of the first mobile body 1 via the gas station to the destination" may be compared with the distance to empty of the first mobile body 1. A "sum of the distance from the current position of the first mobile body 1 to the destination and a predetermined distance" may be compared with the distance to empty of the first mobile body 1.

A "sum of the distance from the current position of the first mobile body 1 to the destination and a distance to the gas station defined based on regional characteristics of the destination" may be compared with the distance to empty of the first mobile body 1. The "distance from the current position of the first mobile body 1 to the gas station" may be compared with the distance to empty of the first mobile body 1.

Additionally, in place of this, a predetermined threshold may be compared with the distance to empty of the first mobile body 1. This predetermined threshold is preferably longer than a distance possible to travel with the remaining fuel level at which a fuel lamp is lighted in the first mobile body 1.

If the determination result is positive (FIG. 4/STEP 330—YES), the server control device 31 refers to the group leader ID associated with the group ID of the touring group to identify the second client 20 of the second user having the group leader ID as the user ID. The server control device 31 transmits to the second client 20 the second route that is a route from the current position of the second mobile body 2 searched out in FIG. 4/STEP 318 to the gas station and a caution message notifying that the condition of the first mobile body 1 is under the second condition in which it is difficult to continue to travel to the destination without fuel resupply (FIG. 4/STEP 332).

The server control device 31 may transmit to, in addition to or in place of the second client 20 of the second user, the second user group the second route that is a route from the current position of the mobile body of the relevant user to the gas station and the caution message.

The server control device 31 may refer to the group leader ID associated with the group ID of the touring group to include the second user having the group leader ID as the user ID in the second user group. A plurality of members may be registered as the group leader.

In the participation registration of the first user in the group, a user having a particular social relationship with the first user (e.g., mentor of the first user) may be registered together, and the server control device 31 may include a user having a user ID registered as a user having a particular social relationship with the first user (user having the user ID associated with the first user ID) in the second user group.

The server control device 31 may include in the second user group a user of the mobile body having a particular regional relationship with the first mobile body 1 (e.g., a mobile body within a predetermined distance in direct distance from a position of the first mobile body 1, a mobile body within a predetermined distance in distance on the route from a position of the first mobile body 1, or a mobile body which is currently running or will run (join) in the future on a route on which the first mobile body 1 will run (e.g., mobile body corresponding to an icon P13*b* shown in FIG. 7A)).

The server control device 31 may include in the second user group, a user of a mobile body having a particular regional relationship with the first mobile body 1, of mobile bodies of users having a particular social relationship with the first user, for example.

The server control device 31 may include in the second user group a user of a mobile body likely to need to go to the gas station (e.g., mobile body under the second condition), of other mobile bodies.

In place of transmitting the route information of the second route by the server control device 31, the second client control device 21 having received the caution message may search for the second route.

Figure 6B:
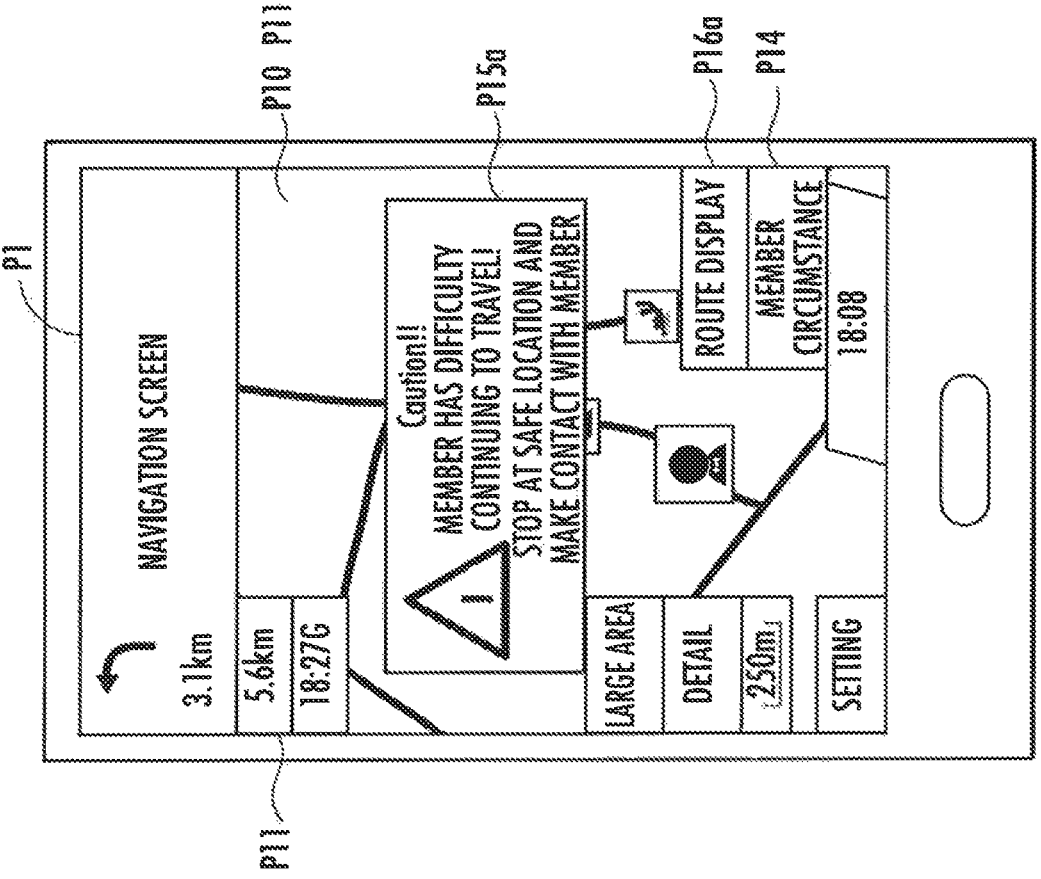
FIG. 6B is a diagram illustrating a configuration of a navigation screen which displays a caution that a user has fallen into a specific condition, that is, illustrating the configuration of the navigation screen which displays the caution that the user has fallen into a second condition.

The second client control device 21 having received the second route and the caution message notifying that the condition of the first mobile body 1 is under the second condition causes the second client output device 23 to display a caution message display P15*b* indicating the caution message which notifies that the condition of the first mobile body 1 is under the second condition together with a route display button P16*b* for indicating the second route to be superimposed on the route guiding image P10 as shown in FIG. 6B (FIG. 4/STEP 216).

Figure 7A:
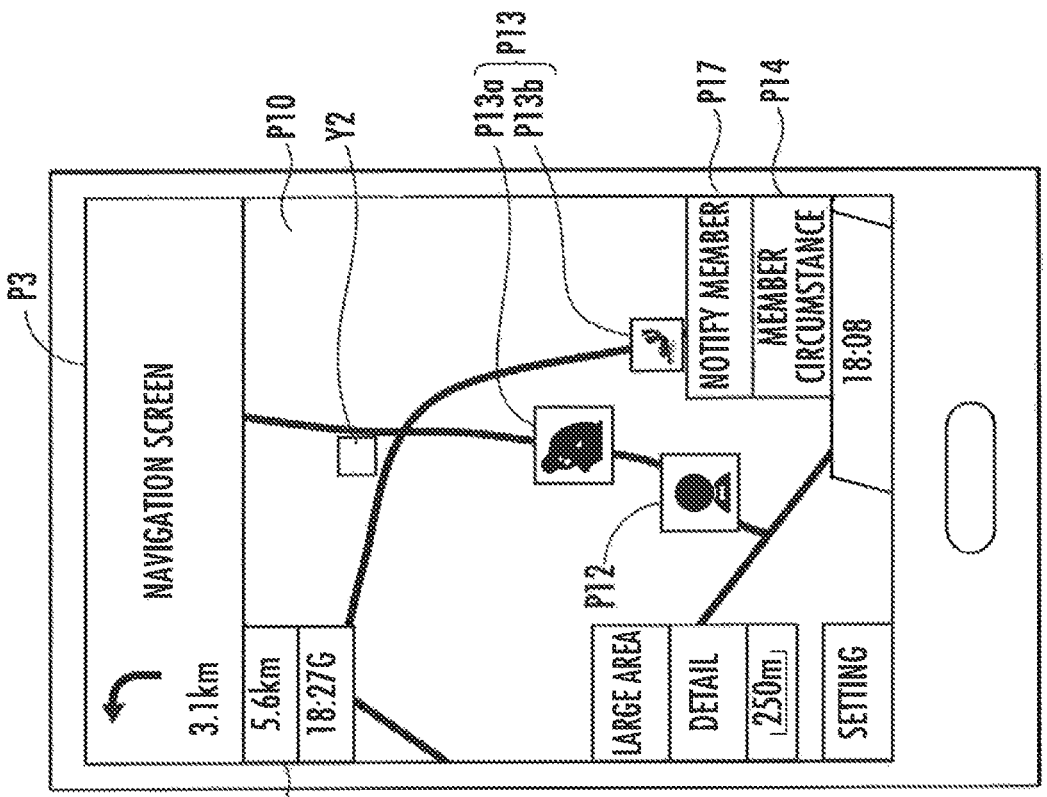
FIG. 7A is a diagram illustrating a position of a gas station to be directed, that is, illustrating the position of the gas station which involves the minimum moving cost for each mobile body running on the same pathway.

The second client control device 21, when detecting pressing-down of the route display button P16*b*, displays the second navigation screen P3 for displaying the second route from the icon P12 indicating the current position of the second mobile body 2 to a position Y1 of the gas station as shown in FIG. 7A (FIG. 4/STEP 218). The second client control device 21 may display the icon P13*a* of the first user under the second condition at a larger size than normal in the second navigation screen P3.

The second navigation screen P3 displays thereon the icon P12 indicating the current position of the second mobile body 2, the position Y1 of the gas station to be directed, and a pathway connecting the icons P12 and Y1 indicating those positions. This gas station position Y1 is, for example, a position that a sum of the moving cost for the first mobile body 1 and the moving cost for the second mobile body 2 is minimum.

The second navigation screen P3 includes a member notification button P17 for notifying the members belonging to the touring group such as the first user of a meeting place. The second client control device 21, when detecting pressing-down of the member notification button P17 via the second client input device 22, transmits to the server 30 a request for notification of the meeting place to the client of each member.

(Gas Station Search Process)

With reference to FIG. 8, a description is given in more detail of the gas station search process performed for each mobile body.

The server control device 31 determines a target mobile body taken into consideration in searching for the gas station on the basis of the position of each mobile body and the information concerning the touring group such as the group leader ID stored in the database 34 (FIG. 8/STEP 334).

The server control device 31 may include the mobile body of the user included in the second user group in FIG. 4/STEP 332 in the target mobile body taken into consideration in searching for the gas station, and in place of or in addition to this, may include the mobile body described below in the target mobile body taken into consideration in searching for the gas station.

For example, the server control device 31, in a case of searching from the current position of the first mobile body 1 corresponding to the icon P13a shown in FIG. 7A to the position of the gas station, may refer to the group leader ID associated with the group ID of the touring group and identify (the position of) the second mobile body 2 of the second user having the group leader ID as the user ID, and include the second mobile body 2 in the target mobile body taken into consideration in searching for the gas station.

In the participation registration of the first user in the group, a user having a particular social relationship with the first user (e.g., mentor of the first user) may be registered together, and the server control device 31 may include in the target mobile body taken into consideration in searching for the gas station, a mobile body of a user having a user ID registered as a user having a particular social relationship with the first user (user having the user ID associated with the first user ID).

The server control device 31, in a case of searching from the current position of the first mobile body 1 corresponding to the icon P13a to the position of the gas station, may include in the target mobile body taken into consideration in searching for the gas station, the mobile body having a particular regional relationship with the first mobile body 1 (e.g., a mobile body within a predetermined distance in direct distance from a position of the first mobile body 1, a mobile body within a predetermined distance in distance on the route from a position of the first mobile body 1, or a mobile body which is currently running or will run (join) in the future on a route on which the first mobile body 1 will run (e.g., mobile body corresponding to the icon P13b shown in FIG. 7A)).

The server control device 31, for example, may include in the target mobile body taken into consideration in searching for the gas station, a mobile body having a particular regional relationship with the first mobile body 1, of mobile bodies of users having a particular social relationship with the first user.

The server control device 31, in a case of searching from the current position of the first mobile body 1 corresponding to the icon P13a to the position of the gas station, may include in the target mobile body taken into consideration in searching for the gas station, a mobile body likely to need to go to the gas station (e.g., mobile body under the second condition), among other mobile bodies.

The server control device 31 searches for the gas station at a position in which a sum of the moving costs from the respective mobile bodies included in a range of the mobile bodies determined in FIG. 8/STEP 334 (a first moving cost that is the moving cost for the first mobile body and a second moving cost that is the moving cost for the second mobile body) is minimum (FIG. 8/STEP 336).

The moving cost may be defined on the basis of at least one of a distance from a current place of the mobile body to a destination, a time required to travel, and a fuel required to travel.

In this case, it is preferable that the server control device 31 evaluates the moving cost for the mobile body to be higher as a deviation degree that is a degree of deviation of each mobile body from the first route, is greater. The deviation degree may be defined on the basis of, for example, at least one of a distance from the first route to the destination to travel to, a time taken to return to the first route, and a fuel required to return to the first route.

This process may, for example, in a case of searching for the gas station with respect to the mobile body corresponding to the icon P13a and the mobile body corresponding to the icon P12 as shown in FIG. 7A, the gas station Y1 on the shortest pathway present ahead of both of the mobile bodies may be searched out as a candidate gas station.

Figure 7B:
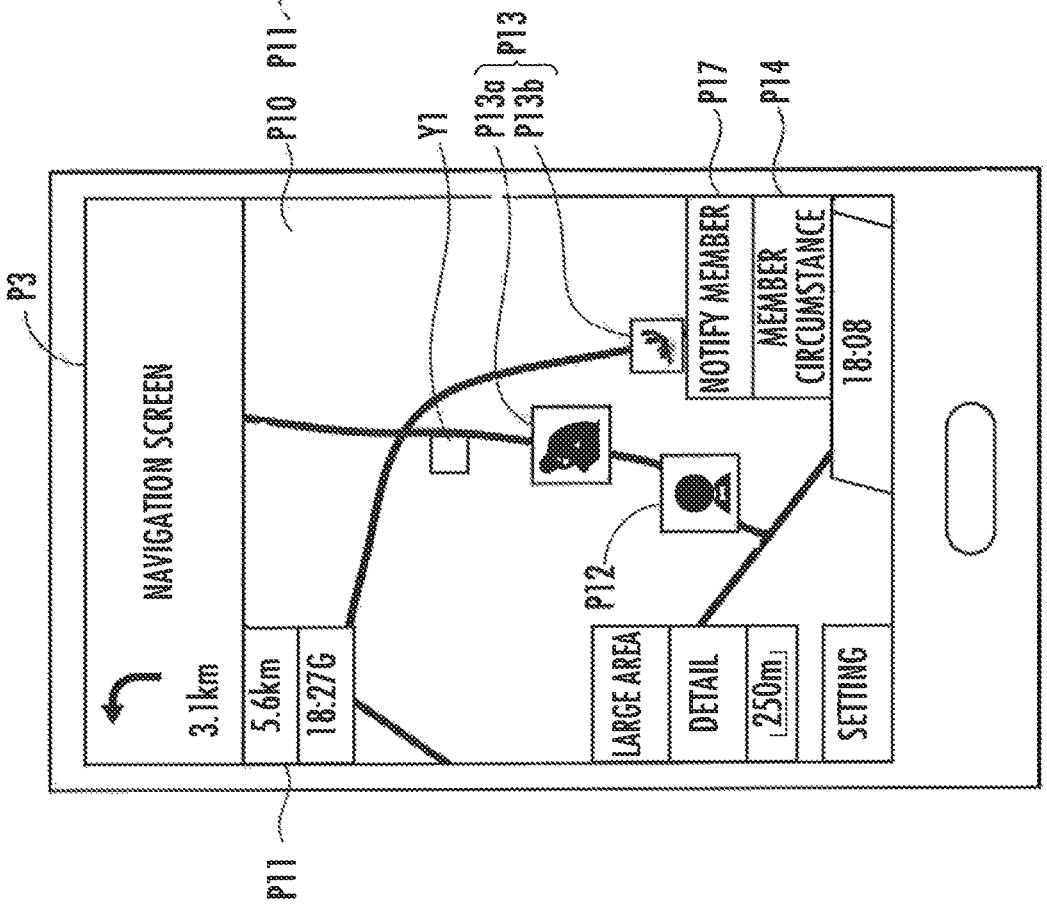
FIG. 7B is a diagram illustrating a position of a gas station to be directed, that is, illustrating the position of the gas station which involves the minimum moving cost for each mobile body running on a different pathway.

Further, as shown in FIG. 7B, in a case of searching for the gas station including the mobile body corresponding to the icon P13b as well as the mobile body corresponding to the icon P13a and the mobile body corresponding to the icon P12 for example, a gas station Y2 which is located along a route for after joining of these mobile bodies may be searched out as a candidate gas station.

Effect According to the Embodiment

According to the server 30 of the above configuration, in the case where a condition of the first user or first mobile body indicated, via communication with the first client 10, in the information of the first user or first mobile body 1 which is connected with the first client 10 is under the specific condition (the first condition or the second condition) (FIG. 4/STEP 320—YES or FIG. 4/STEP 330—YES), a notification that the condition of the first mobile body 1 or first user is under the specific condition is transmitted to the second client 20 (FIG. 4/STEP 324 or FIG. 4/STEP 332). This allows the second user to easily recognize the condition of the first user or first mobile body 1 which is likely to affect the action of the group.

According to the server 30 of the above configuration, the second user is caused to easily recognize that the remaining fuel level of the first mobile body 1 affecting the distance to empty of the first mobile body 1 becomes a predetermined threshold or less.

As a result, the second user can be given an opportunity for being caused to take an action in consideration of the condition of the first mobile body, for example, the second user instructs the member of the group to stop by the gas station or an electric charge facility, or the second user stops by the nearest gas station or electric charge facility to the first user in order to join the first user.

According to the server 30 of the above configuration, in the case where a probability of shortage of a remaining level of motive power required for any first mobile body 1 is high in consideration of the remaining level of at least one of the fuel or the electric power which are required to travel all the route (FIG. 4/STEP 330—YES), the second user is notified of that situation (FIG. 4/STEP 332—YES).

As a result, the second user can be appropriately given an opportunity for being caused to take an action in consideration of the condition of the first mobile body 1.

According to the server 30 of the above configuration, the position of the gas station in which the sum of the first moving cost and the second moving cost is minimum, is transmitted to the second client 20 (FIG. 4/STEP 332). This can give the second user an opportunity for taking an appropriate action in consideration of the condition of the first mobile body while reducing a burden on both of the first user and the second user.

According to the server of the above configuration, the gas stations Y1 and Y2 present at positions which have smaller deviation from the route of each mobile body belonging to the group are evaluated as the gas station whose moving cost from the mobile body belonging to the group is low. As a result, the gas stations Y1 and Y2 are appropriately searched out which are present at the positions not involving the mobile body belonging to the group to make a big change of the route (see FIG. 8/STEP 336, FIG. 7A, and FIG. 7B), and thus, the second user is notified of the positions of the gas stations Y1 and Y2 where each member can gather without getting a feeling of strangeness.

According to the server of the above configuration, a destination to be notified of the condition of the first mobile body 1 can be changed depending on a type of the condition of the first mobile body 1 (FIG. 4/STEP 324 and FIG. 4/STEP 332), and thus, the condition of the first mobile body which is likely to affect the action of the group is appropriately shared.

Other Embodiments

In the embodiment, the server 30 performs the information sharing process in an event and the gas station search process, but in place of this, for example, the first client control device 11 may receive necessary information from the server 30 or another client, and perform the process at STEP 312 to STEP 332 on the basis of the received information to transmit the result thereof to the server 30 or another client.

In the embodiment, various pieces of information is transmitted to the second user having the group leader ID as the user ID, but in place of this, the respective information may be transmitted to the second user not having the group leader ID as the user ID.

In the embodiment, the server control device 31 determines the second condition when the distance to empty indicating the remaining level of the first energy falls below the threshold, but in place of or in addition to this, the second condition may be determined when (a parameter representing) the remaining level of the second energy falls below the threshold.

In the embodiment, the first client and the second client are configured by a separate client, but in place of this, a client having a function of both of the first client and the second client may be used as the first client and the second client.

In the embodiment, the position of the gas station at a position whose sum of the moving costs of the respective mobile bodies included in a member range is minimum, is searched (FIG. 8/STEP 336), but in place of this, a position of a gas station at a position whose moving cost for the mobile body under the specific condition (the first condition or the second condition) is minimum may be searched.

REFERENCE SIGNS LIST

1 First mobile body
2 Second mobile body
10 First client
20 Second client
30 Server
31 Server control device
35 Server communication device

What is claimed is:

1. A server which communicates with a first client via a server communication device to recognize information concerning a first user that is a user of the first client or concerning a first mobile body on which the first user rides, the server comprising:

a database storing a user ID of each user and at least one group ID of a touring group for a destination associated with some of the user IDs, wherein a second client used by a second user belonging to a same group as the first user; and a server control device comprising at least one hardware memory including computer program code, wherein the at least one hardware memory and the computer program code are configured to, with the at least one hardware processor, cause the server control device at least to, determine if a condition of the first user or the first mobile body is under
a first condition, in one kind of trouble on travelling, comprising a specific condition in which it is difficult for the first mobile body to continue to travel, or a specific condition in which health condition of the first user has been determined, or
under a second condition, in another kind of trouble on travelling, in which a distance possible to continuously travel without energy resupply for the first mobile body falls below a distance threshold, refer to the database to recognize the second user who is recognized by a user ID of the second user associated with a group ID associated with a user ID of the first user, notify a client of each user belonging to a first user group, which includes all users belonging to a touring group for a destination the second user belongs to that the condition of the first user or the first mobile body is under the first condition if determining that the condition of the first user or the first mobile body is under the first condition via the server communication device, notify a client of each user belonging to a second user group, which includes the second user having either a particular social relationship or a particular regional relationship with the first user that the condition of the first user or the first mobile body is under the second condition if determining that the condition of the first user or the first mobile body is under the second condition, determine that the condition of the first mobile body is under the second condition when a parameter, which is shown in the information received via the server communication device, falls below a threshold, the parameter representing a remaining level of a first energy that is energy consumed in running of the first mobile body or a remaining level of a second energy that is energy consumed in other than the running of the first mobile body, recognize a current position of the first mobile body via the communication with the first client, search for a first route that is a route connecting the current position of the first mobile body with a destination, define the distance threshold on a basis of the remaining level of the first energy which is required to travel all the first route, recognize a current position of a second mobile body that is a mobile body of the second user via communication with the second client, if determining that the parameter falls below the threshold, search for an energy supply facility that allows a sum of a first moving cost that is a moving cost for the first mobile body and a second moving cost that is a moving cost for the second mobile body to be minimum based on the current position of the first mobile body and the current position of the second mobile body, and transmit a position of the energy supply facility searched via the server communication device to the second client, recognize current positions of a part or all of the mobile bodies belonging to the group via communication with the first client and the second client, search for a first route that is a route connecting a current position of each of the part or all of the mobile bodies with a destination of the mobile body, and in searching for a second route that is a route connecting the current position of the mobile body with the energy supply facility, evaluate the moving cost of the mobile body such that the moving cost for the mobile body to the energy supply facility is higher as a deviation degree that is a degree of deviation from the first route is greater.

2. The server according to claim 1, wherein the at least one memory and the computer program code are further configured to, with the at least one processor, cause the server control device to recognize a current position of the first mobile body via the communication with the first client, and transmit a position of an energy supply facility, the position of which a first moving cost that is a moving cost for the first mobile body is minimum, to the second client when the parameter falls below the threshold.

3. The server according to claim 1, wherein the first user group includes all users belonging to the group, and the second user group includes another user or a user of another mobile body that is under the second condition.

4. A system comprising:
a first client used by a first user;
a second client used by a second user belonging to a same group as the first user; and
a server which communicates with the first client via a server communication device to recognize information concerning the first user or concerning a first mobile body on which the first user rides, wherein the server includes
a database storing a user ID of each user and at least one group ID of a touring group for a destination associated with some of the user IDs, and a server control device comprising at least one hardware memory including computer program code, wherein the at least one hardware memory and the computer program code are configured to, with the at least one hardware processor, cause the server control device at least to, determine if a condition of the first user or the first mobile body is under a first condition, in one kind of trouble on travelling, comprising a specific condition in which it is difficult for the first mobile body to continue to travel, or a specific condition in which health condition of the first user has been determined, or under a second condition, in another kind of trouble on travelling, in which a distance possible to continuously travel without energy resupply for the first mobile body falls below a distance threshold, refer to the database to recognize the second user who is recognized by a user ID of the second user associated with a group ID associated with a user ID of the first user, notify a client of each user belonging to a first user group, which includes all users belonging to a touring group for a destination the second user belongs to that the condition of the first user or the first mobile body is under the first condition if determining that the condition of the first user or the first mobile body is under the first condition via the server communication device, notify a client of each user belonging to a second user group, which includes the second user having either a particular social relationship or a particular regional relationship with the first user that the condition of the first user or the first mobile body is under the second condition if determining that the condition of the first user or the first mobile body is under the second condition, determine that the condition of the first mobile body is under the second condition when a parameter, which is shown in the information received via the server communication device, falls below a threshold, the parameter representing a remaining level of a first energy that is energy consumed in running of the first mobile body or a remaining level of a second energy that is energy consumed in other than the running of the first mobile body, recognize a current position of the first mobile body via the communication with the first client, search for a first route that is a route connecting the current position of the first mobile body with a destination, define the distance threshold on a basis of the remaining level of the first energy which is required to travel all the first route, recognize a current position of a second mobile body that is a mobile body of the second user via communication with the second client, if determining that the parameter falls below the threshold, search for an energy supply facility that allows a sum of a first moving cost that is a moving cost for the first mobile body and a second moving cost that is a moving cost for the second mobile body to be minimum based on the current position of the first mobile body and the current position of the second mobile body, and transmit a position of the energy supply facility searched via the server communication device to the second client, recognize current positions of a part or all of the mobile bodies belonging to the group via communication with the first client and the second client, search for a first route that is a route connecting a current position of each of the part or all of the mobile bodies with a destination of the mobile body, and in searching for a second route that is a route connecting the current position of the mobile body with the energy supply facility, evaluate the moving cost of the mobile body such that the moving cost for the mobile body to the energy supply facility is higher as a deviation degree that is a degree of deviation from the first route is greater.

5. A server which communicates with a first client via a server communication device to recognize information concerning a first user that is a user of the first client or concerning a first mobile body on which the first user rides, the server comprising:

a database storing a user ID of each user and at least one group ID of a touring group for a destination associated with some of the user IDs, wherein a second client used by a second user belonging to a same group as the first user; and a server control device comprising at least one hardware memory including computer program code, wherein the at least one hardware memory and the computer program code are configured to, with the at least one hardware processor, cause the server control device at least to, determine if a condition of the first user or the first mobile body is under a first condition, in one kind of trouble on travelling, comprising a specific condition in which it is difficult for the first mobile body to continue to travel, or a specific condition in which health condition of the first user has been determined, or under a second condition, in another kind of trouble on travelling, in which a distance possible to continuously travel without energy resupply for the first mobile body falls below a distance threshold, refer to the database to recognize the second user who is recognized by a user ID of the second user associated with a group ID associated with a user ID of the first user, notify a client of each user belonging to a first user group, which includes all users belonging to a touring group for a destination the second user belongs to that the condition of the first user or the first mobile body is under the first condition if determining that the condition of the first user or the first mobile body is under the first condition via the server communication device, notify a client of each user belonging to a second user group, which includes the second user having either a particular social relationship or a particular regional relationship with the first user that the condition of the first user or the first mobile body is under the second condition if determining that the condition of the first user or the first mobile body is under the second condition, recognize a current position of the first mobile body via the communication with the first client, recognize a current position of a second mobile body that is a mobile body of the second user via communication with the second client, determine that the condition of the first mobile body is under the second condition if a parameter, which is shown in the information received via the server communication device, falls below a threshold, the parameter representing a remaining level of a first energy that is energy consumed in running of the first mobile body or a remaining level of a second energy that is energy consumed in other than the running of the first mobile body, if determining that the parameter falls below the threshold, search for an energy supply facility that allows a sum of a first moving cost that is a moving cost for the first mobile body, and a second moving cost that is a moving cost that is a moving cost for the second mobile body to be minimum based on the current position of the first mobile body and the current position of the second mobile body, transmit a position of the energy supply facility searched via the server communication device to the second client, search for a first route that is a route connecting the current position of the first mobile body with a destination, and define a distance threshold on a basis of the remaining level of the first energy which is required to travel all the first route, recognize current positions of a part or all of the mobile bodies belonging to the group via communication with the first client and the second client, search for a first route that is a route connecting a current position of each of the part or all of the mobile bodies with a destination of the mobile body, and in searching for a second route that is a route connecting the current position of the mobile body with the energy supply facility, evaluate the moving cost of the mobile body such that the moving cost for the mobile body to the energy supply facility is higher as a deviation degree that is a degree of deviation from the first route is greater.

6. A system comprising:

a first client used by a first user;

a second client used by a second user belonging to a same group as the first user; and a server which communicates with the first client via a server communication device to recognize information concerning the first user or concerning a first mobile body on which the first user rides, wherein the server includes, a database storing user ID of each user and at least one group ID of a touring group for a destination associated with some of the user IDs, and a server control device comprising at least one hardware memory including computer program code, wherein the at least one hardware memory and the computer program code are configured to, with the at least one hardware processor, cause the server control device at least to determine if a condition of the first user or the first mobile body is under
a first condition, in one kind of trouble on travelling, comprising a specific condition in which it is difficult for the first mobile body to continue to travel, or a specific condition in which health condition of the first user has been determined, or
under a second condition, in another kind of trouble on travelling, in which a distance possible to continuously travel without energy resupply for the first mobile body falls below a distance threshold,
refer to the database to recognize the second user who is recognized by a user ID of the second user associated with a group ID associated with a user ID of the first user,
notify a client of each user belonging to a first user group, which includes all users belonging to a touring group for a destination the second user belongs to that the condition of the first user or the first mobile body is under the first condition if determining that the condition of the first user or the first mobile body is under the first condition via the server communication device,
notify a client of each user belonging to a second user group, which includes the second user having either a particular social relationship or a particular regional relationship with the first user that the condition of the first user or the first mobile body is under the second condition if determining that the condition of the first user or the first mobile body is under the second condition,
recognize a current position of the first mobile body via the communication with the first client,
recognize a current position of a second mobile body that is a mobile body of the second user via communication with the second client,
determine that the condition of the first mobile body is under the second condition if a parameter, which is shown in the information received via the server communication device, falls below a threshold, the parameter representing a remaining level of a first energy that is energy consumed in running of the first mobile body or a remaining level of a second energy that is energy consumed in other than the running of the first mobile body,
if determining that the parameter falls below the threshold, search for an energy supply facility that allows a sum of a first moving cost that is a moving cost for the first mobile body, and a second moving cost that is a moving cost that is a moving cost for the second mobile body to be minimum based on the current position of the first mobile body and the current position of the second mobile body,
transmit a position of the energy supply facility searched via the server communication device to the second client,
search for a first route that is a route connecting the current position of the first mobile body with a destination, and
define a distance threshold on a basis of the remaining level of the first energy which is required to travel all the first route,
recognize current positions of a part or all of the mobile bodies belonging to the group via communication with the first client and the second client,
search for a first route that is a route connecting a current position of each of the part or all of the mobile bodies with a destination of the mobile body, and
in searching for a second route that is a route connecting the current position of the mobile body with the energy supply facility, evaluate the moving cost of the mobile body such that the moving cost for the mobile body to the energy supply facility is higher as a deviation degree that is a degree of deviation from the first route is greater.

* * * * *